March 29, 1960
R. S. WATERS
2,930,596
BLENDER JAR ASSEMBLY
Filed June 27, 1958
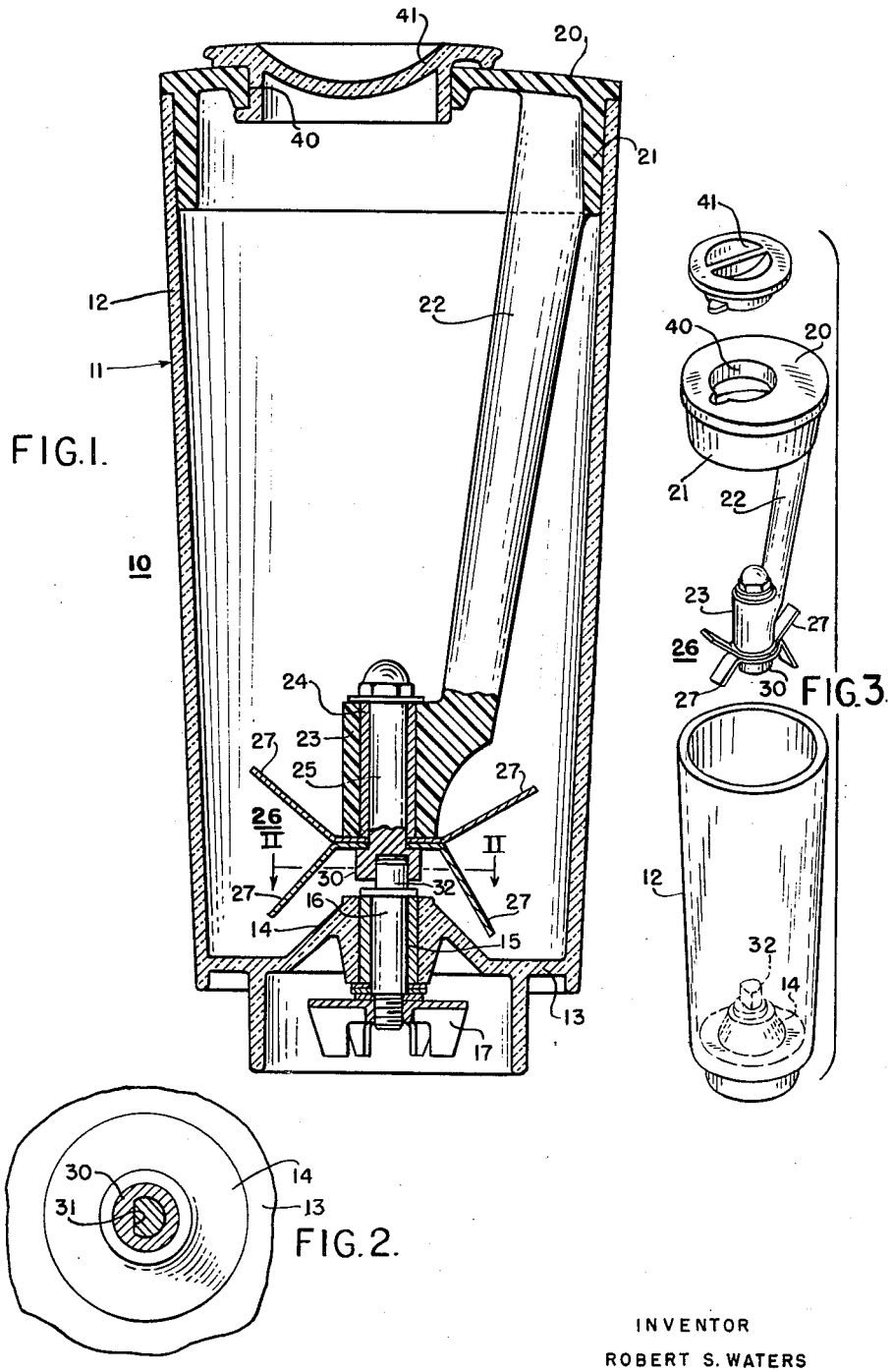
INVENTOR
ROBERT S. WATERS
BY Ralph T. French
ATTORNEY United States Patent Office 2,930,596
Patented Mar. 29, 1960

2,930,596

BLENDER JAR ASSEMBLY

Robert S. Waters, Feeding Hills, Mass., assignor to Westinghouse Electric Corporation, East Pittsburgh, Pa., a corporation of Pennsylvania Application June 27, 1958, Serial No. 745,068

5 Claims. (Cl. 259—122)

This invention relates to blenders, mixers, agitators and the like and has for an object to provide improved apparatus of this character.

In blenders having the blades fixed to the bottom of the container it is possible to remove the cover while the blades are rotating, with the result that hands or instruments that may be inserted into the jar may be seriously injured or damaged.

Further, with devices of this type where the blades are fixed in the bottom of the container, it is difficult to remove food particles from around the blades and to clean the blades as well as the bottom of the container.

These disadvantages are completely eliminated by the present invention which provides a blender container wherein a drive shaft is rotatably mounted in the bottom wall of the container but the blades are rotatably mounted at the free end of an arm carried by the container cover and extending into the lower portion of the container. The impeller and the inner end of the bottom wall mounted shaft carry mating coupling means which are drivingly engaged upon movement of the container cover or closure to closing position. Upon removal of the cover from the container the impeller is likewise removed with the result that there is neither any danger of injury to fingers inserted within the container nor any difficulty in cleaning either the impeller or the container itself.

The container closure or cover may be provided with a relatively small access opening through which material to be blended may be inserted after the main closure and the impeller carried thereby have been assembled with the container.

The foregoing and other advantages are effected by the invention as will be apparent from the following description and claims taken in connection with the accompanying drawings, forming a part of this application, in which:

Fig. 1 is a vertical sectional view through a blender or the like constructed in accordance with the present invention;

Fig. 2 is a transverse sectional view taken along the line II—II of Fig. 1, looking in the direction indicated by the arrows; and Fig. 3 is an exploded perspective view of the various parts comprising the blender of Fig. 1.

Referring to the drawing in detail, the reference character 10 indicates, in its entirety, a blender or like device comprising a container 11 which may be of transparent or translucent material having a side wall 12 of circular cross section and preferably slightly flared from bottom to top, and a bottom wall 13. Obviously, the container side wall 12 may be other than circular in cross section; for example, rectangular, triangular, etc.

The bottom wall 13 is provided with a boss 14 in which is carried a sleeve 15 serving as a bearing for a shaft 16 rotatable therein and carrying at its lower terminal portion a coupling member 17 of conventional type by which the shaft 16 may be driven when the blender 10 is placed upon the usual motor operated blender base (not shown).

The container 11 has an open upper end which is closed during use by a cover or closure member 20, preferably of hard rubber or plastic material and provided with a depending flange 21 closely engaging the upper portion of the container side wall 12.

An arm 22 is formed integral with the cover or closure 20 and depends into the container 12 with its lower terminal portion 23 in the lower portion of the container. A sleeve 24 is carried by the arm terminal portion 23 and provides a bearing for the rotatable shaft 25 of an impeller 26 having a plurality of blades 27 of any suitable configuration. The lower terminal portion 30 of the impeller shaft 25 constitutes a coupling for driving engagement with the upper terminal portion 32 of the shaft 16, and for this purpose is provided with a non-circular recess 31 for receiving the shaft terminal portion 32 which is of similar non-circular shape.

Preferably the shaft 16 and the impeller shaft 25 are both disposed along the axial center line of the impeller container 12 and when the closure 20 is moved into container closing position the two shafts will be aligned and the cooperating coupling means 30 and 32 thereof will readily mate. Inasmuch as the shaft 25 is disposed on the axial center line of the container, the rotation of the closure will rotate the impeller shaft, thereby enabling the two coupling means to be suitably aligned for engagement during the final movement of the closure to closing position.

It should be noted that the closure flange 21 is relatively deep, thereby accomplishing two functions. Firstly, the relatively great depth of the flange insures that the closure will not be tilted as it nears its innermost position, thereby insuring that there will be no misalignment of the coupling means between the impeller 26 and the shaft 16. Secondly, the depth of the flange 21 is materially greater than the axial length of the engaging surfaces of the coupling means 32, with the result that upon removal of the closure 20, it is assured that the drive from the shaft 16 to the impeller 26 will be interrupted before the cover is completely removed.

While with the blending of many materials, particularly liquids and relatively small pieces of solid material the impeller and its arm could be inserted into place after filling of the container, it will be apparent that there could be situations in which it would be necessary to first assemble the impeller in the container before inserting the materials to be blended. To take care of this latter situation the closure 20 is provided with an opening 40 for the insertion of either solid materials or liquids and this opening is closed by a suitable cover or closure 41. Preferably this opening 40 is of sufficiently small size to prohibit the entry or passage therethrough of a child's hand, thereby preventing accidental injury.

While the invention has been shown in but one form, it will be obvious to those skilled in the art that it is not so limited, but is susceptible of various changes and modifications without departing from the spirit thereof.

What is claimed is:

1. In a blender or the like, an open-top container including a bottom wall, said wall having a bore therethrough; a shaft rotatably mounted in said bore and having terminal portions extending beyond said wall at opposite sides thereof; a coupling member carried by the lower terminal portion of said shaft, whereby said shaft may be disengageably coupled to a driving mechanism; a removable closure for the open top of the container; an arm carried by said closure and extending toward the bottom wall of the container; an impeller rotatably mounted on the free end of said arm; cooperating coupling means carried by the impeller and the shaft upper terminal portion, whereby rotary motion of the shaft may be imparted to the impeller, said cooperating coupling means being separable upon removal of the closure from the container.

2. In a blender or the like, an open-top container including a bottom wall having a bore therethrough; a shaft rotatably mounted in said bore and having first and second terminal portions disposed within and below the container, respectively; a closure for said container including a depending flange closely engaging the upper portion of the container; an arm carried by the closure and depending within the container; an impeller rotatably mounted on the lower portion of the depending arm and including a clutch portion mating with a corresponding clutch portion on the shaft first terminal portion when the closure is in container-closing position, whereby rotation of said shaft imparts rotation to the impeller, the depth of the closure depending flange being materially greater than the axial extent of mating engagement of the clutch portions of said impeller and said shaft first terminal portion, whereby upon removal of the closure, the clutch portions disengage before the closure flange disengages the container; and means carried by the shaft second terminal portion for engaging a driving mechanism.

3. In a blender or the like, an open-top container including a bottom wall having a bore therethrough; a shaft rotatably mounted in said bore and having terminal portions extending beyond said wall at opposite sides thereof; a coupling member carried by the lower terminal portion of said shaft, whereby said shaft may be disengageably coupled to a driving mechanism; a removable closure for the open top of the container; an arm carried by said closure and extending toward the container bottom wall; an impeller rotatably mounted on the free terminal portion of said arm; and cooperating coupling means carried by the impeller and the shaft upper terminal portion, whereby rotary motion of the shaft may be imparted to the impeller, said cooperating coupling means being separable upon removable of the closure from the container, and said closure having an opening therethrough for admission to the container, while closed by said closure, of materials to be blended.

4. In a blender or the like, an open-top container for materials to be blended, a closure for the container open top, an arm carried by said closure with its free end portion adapted to extend into the lower portion of said container, an impeller rotatably carried by the free end portion of said arm, and a driving shaft rotatably mounted in a wall of said lower portion of the container and having a separable driving connection with said impeller, which connection is separated upon removal of said closure from said container.

5. In a blender or the like, an open-top container for materials to be blended including bottom and side wall structure; a closure for the container open top including a depending flange closely engaging the upper portion of the container side wall structure; a shaft rotatably mounted in said container bottom wall and having first and second terminal portions disposed within and below the container, respectively; coupling mechanism carried by the shaft second terminal portion, whereby said shaft may be disengageably coupled to a driving mechanism; an arm secured at one end to the closure and disposed within the container with its free terminal portion disposed near the closure bottom wall; an impeller rotatably mounted on the free terminal portion of said arm; said impeller and said shaft first terminal portion having cooperating coupling means engageable upon movement of the closure to container-closing position; the depending flange of said closure being of sufficient depth to guide said cooperating coupling means into driving engagement during container-closing movement of the closure.

References Cited in the file of this patent

UNITED STATES PATENTS

| | | |
|---|---|---|
| 2,733,052 | Lather | Jan. 31, 1956 |
| 2,837,320 | Baron | June 3, 1958 |